United States Patent
DeSota et al.

(10) Patent No.: US 8,578,130 B2
(45) Date of Patent: Nov. 5, 2013

(54) PARTITIONING OF NODE INTO MORE THAN ONE PARTITION

(75) Inventors: Donald R. DeSota, Portland, OR (US);
Bruce M. Gilbert, Beaverton, OR (US);
Robert Joersz, Portland, OR (US);
Wayne A. Downer, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 981 days.

(21) Appl. No.: 10/386,216

(22) Filed: Mar. 10, 2003

(65) Prior Publication Data

US 2004/0181647 A1   Sep. 16, 2004

(51) Int. Cl.
*G06F 9/00* (2006.01)

(52) U.S. Cl.
USPC .......................................................... 712/13

(58) Field of Classification Search
USPC .......................................................... 712/13
See application file for complete search history.

(56) References Cited

U.S. PATENT DOCUMENTS

| | | | |
|---|---|---|---|
| 5,659,786 A * | 8/1997 | George et al. | 713/100 |
| 6,226,734 B1 * | 5/2001 | Kleinsorge et al. | 712/13 |
| 6,247,109 B1 | 6/2001 | Kleinsorge et al. | |
| 6,279,098 B1 * | 8/2001 | Bauman et al. | 712/13 |
| 6,289,021 B1 * | 9/2001 | Hesse | 370/409 |
| 6,910,108 B2 * | 6/2005 | Downer et al. | 711/141 |

OTHER PUBLICATIONS

Rosenberg, Jerry M. "Dictionary of Computers, Information Processing, and Telecommunications". John Wiley & Sons, 2nd Edition, 1987. pp. 153 and 413-414.*
Patterson, David. Hennessy, John. "Computer Architecture: A Quantitative Approach". Morgan-Kaufmann Publishers, Third Edition. May 17, 2002, pp. 531-532, 845-847.*
Patterson, David. Hennessy, John. "Computer Architecture: A Quantitative Approach". Morgan Kaufmann Publishers, Inc. pp. 39-41, 1996.*
Foldoc: "cache" article. 2 pages, Jun. 25, 1997.*
Letter from IBM China IP Law Department indicating that China Patent Office located 6,247,109 patent reference during prosecution. This letter serves as an effective translation of the Chinese search report.

* cited by examiner

*Primary Examiner* — Robert Fennema
(74) *Attorney, Agent, or Firm* — Steven Bennett (57) ABSTRACT

Partitioning a node of a multi-node system into more than one partition is disclosed. First resources of the node are physically partitioned into more than one partition. The first resources physically partitioned to each partition are directly inaccessible by other partitions of the node. Second resources of the node are then internally logically partitioned into the more than one partition. Each second resource internally separates transactions of one partition from transactions of other partitions. Furthermore, the node can be dynamically repartitioned into other partitions, such as a single partition, without having to take the multi-node system down. Operating system (OS) instances of the partitions may have assumptions provided to allow for dynamic partitioning, such as quiescing the processors and/or the input/output components being reconfigured, purging remote cache entries across the entire OS, etc. Each partition may have associated therewith registers that are protected from access by other partitions.

14 Claims, 6 Drawing Sheets

PARTITIONING OF NODE INTO MORE THAN ONE PARTITION

BACKGROUND OF THE INVENTION

1. Technical Field

This invention relates generally to partitioning a multi-node system of nodes into more than one partition, and more specifically to partitioning a single node of the system into more than one partition.

2. Description of the Prior Art

There are many different types of multi-processor computer systems. A symmetric multi-processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processor system in which memory is separated into distinct banks. NUMA systems are similar to SMP systems. In SMP systems, however, all processors access a common memory at the same speed. By comparison, in a NUMA system, memory on the same processor board, or in the same building block, node, as the processor is accessed faster than memory on other processor boards, or in other building blocks, or nodes. That is, local memory is accessed faster than distant shared memory. NUMA systems generally scale better to higher numbers of processors than SMP systems.

Multi-processor, or multi-node, systems are large-scale computing systems that usually allow partitioning to divide their resources among different operating system (OS) instances. These divisions typically occur at physical boundaries within the system, such as at nodes. Such division is referred to as physical partitioning, and usually there is a protection mechanism between partitions, so that partitions do not improperly access the resources of other partitions. Furthermore, dynamic partitioning allows the partition boundaries to be modified while the system is running, without having to take the system down, which can be disadvantageous.

Limiting partitioning to physical boundaries means that the sizes of the partitions have a fixed minimum size. Within a multi-node system, partitioning is usually accomplished down to the node level, and no lower. That is, the smallest physical size of a partition is a single node of the system, and a single node cannot, for example, be partitioned into more than one partition. However, nodes themselves have become very powerful, and limiting each node to just one partition may be larger than what is needed, thus wasting resources. For this and other reasons, therefore, there is a need for the present invention.

SUMMARY OF THE INVENTION

The invention relates to partitioning a node into more than one partition. In a method of the invention for physically partitioning a node of a multi-node system into more than one partition, first resources of the node are physically partitioned into more than one partition. The first resources physically partitioned to each partition are directly inaccessible by other partitions of the node. Each first resource is accessible over the multi-node system through the partition to which the resource has been physically partitioned. Second resources of the node are then internally logically partitioned into the more than one partition. Each second resource internally separates transactions of one partition from transactions of other partitions. Each second resource is also accessible over the multi-node system through the partition to which the resource has been logically partitioned.

Another method of the invention first receives a transaction by a partition of a node of a multi-node system. It is determined whether the transaction relates to a resource of the partition. In response to determining that the transaction relates to a resource of the partition, the transaction is processed. Otherwise, the transaction is sent to another partition of the node having a resource to which the transaction relates.

A multi-node system of the invention includes a number of nodes, where each node is partitionable into one or more partitions. Each node includes first resources dynamically physically partitionable into the partitions, and second resources internally logically physically partitionable among the partitions. Other features, aspects, embodiments and advantages of the invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DESCRIPTION OF THE PREFERRED EMBODIMENT

Method and Overview

Figure 1:
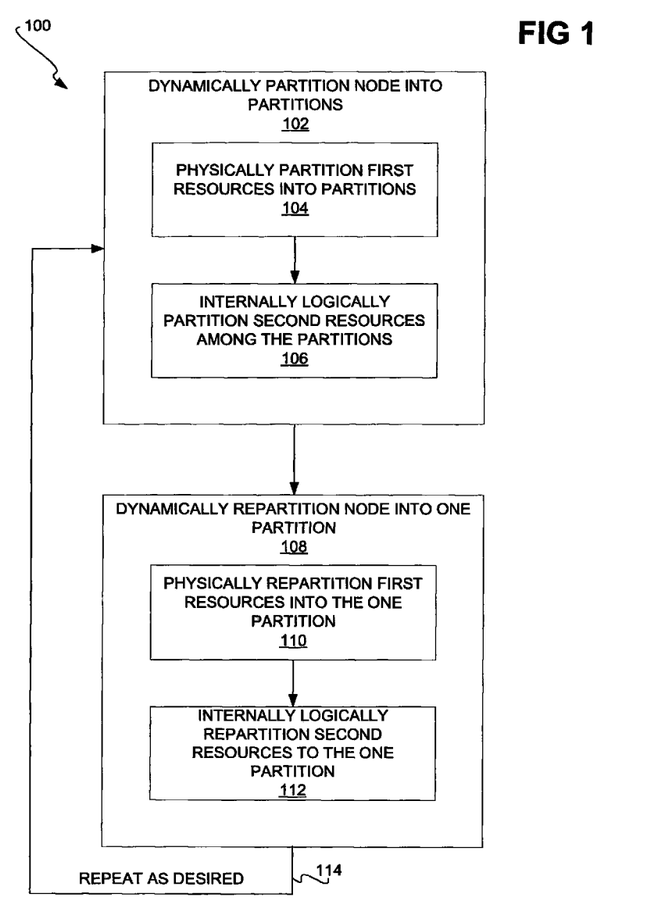
FIG. 1 is a flowchart of a method according to a preferred embodiment of the invention, and is suggested for printing on the first page of the patent.

FIG. 1 shows a method 100 according to a preferred embodiment of the invention. The method 100 can be implemented as an article of manufacture having a computer-readable medium and means in the medium for performing the functionality of the method 100. The medium may be a recordable data storage medium, a modulated carrier signal, or another type of medium, whereas the means may be computer-executable instructions, such as a computer program, and so on. The method 100 preferably is operable within a node of a multiple-processor, or multi-node, system.

The node is dynamically partitioned into more than one partition (102). For instance, preferably the node is partitioned into two partitions. However, in alternative embodiments of the invention, the node is partitioned into more than two partitions. Dynamically partitioning the node into more than one partition is accomplished in two parts. First, separate resources of the node are physically partitioned into the partitions of the node (104). The first resources partitioned to a given partition of the node are resources that are directly inaccessible by other partitions of the node.

Examples of such first resources include local memory of the node, local processors of the node, and input/output (I/O) components of the node, as is described in more detail in later sections of the detailed description. A secondary controller is preferably partitioned to each partition of the node, and exclusively manages access to a portion of the local memory of the node and a subset of the local processors of the node correspondingly partitioned to the partition of the secondary controller. Similarly, an I/O controller is preferably partitioned to each partition of the node, and exclusively manages access to a subset of the I/O components of the node correspondingly partitioned to the partition of the I/O controller.

Next, second, shared resources of the node are internally logically partitioned into the partitions of the node (106). The second resources partitioned to a given partition of the node are shared resources that remain directly accessible by other partitions of the node. Examples of such second resources include primary controllers and remote cache memory of the node. Each shared resource internally separates transactions of one partition from transactions of the other transactions. For instance, each primary controller accommodates transactions from all the partitions, but internally ensures that transactions of each partition do not allow access to or share information regarding the transactions of the other partitions.

Once the node has been partitioned into partitions, it may then be dynamically repartitioned into other partitions, without having to take the entire multi-node system offline, or down. For instance, the node may be dynamically repartitioned into a single partition (108). This involves physically repartitioning the first, separate resources into the single partition (110), and internally logically repartitioning the second, shared resources into the single partition (112). As desired, the process of dynamically repartitioning the node into more than one partition, and/or into a single partition, can be repeated, as indicated by the arrow 114.

Technical Background and Representative System

Figure 2:
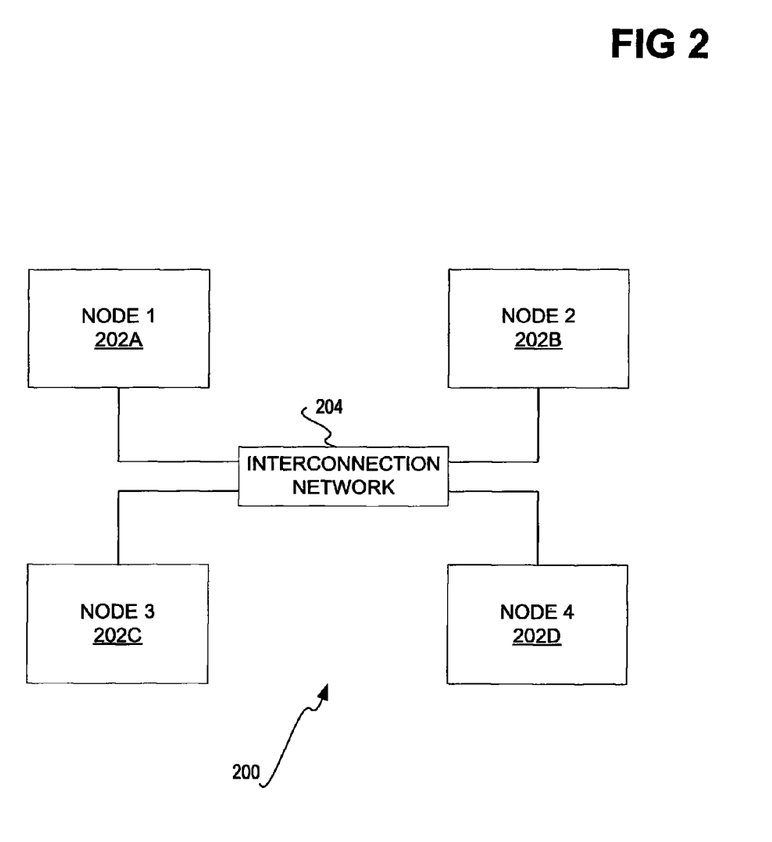
FIG. 2 is a diagram of a multi-node system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. The nodes 202 are connected with one another through an interconnection network 204. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
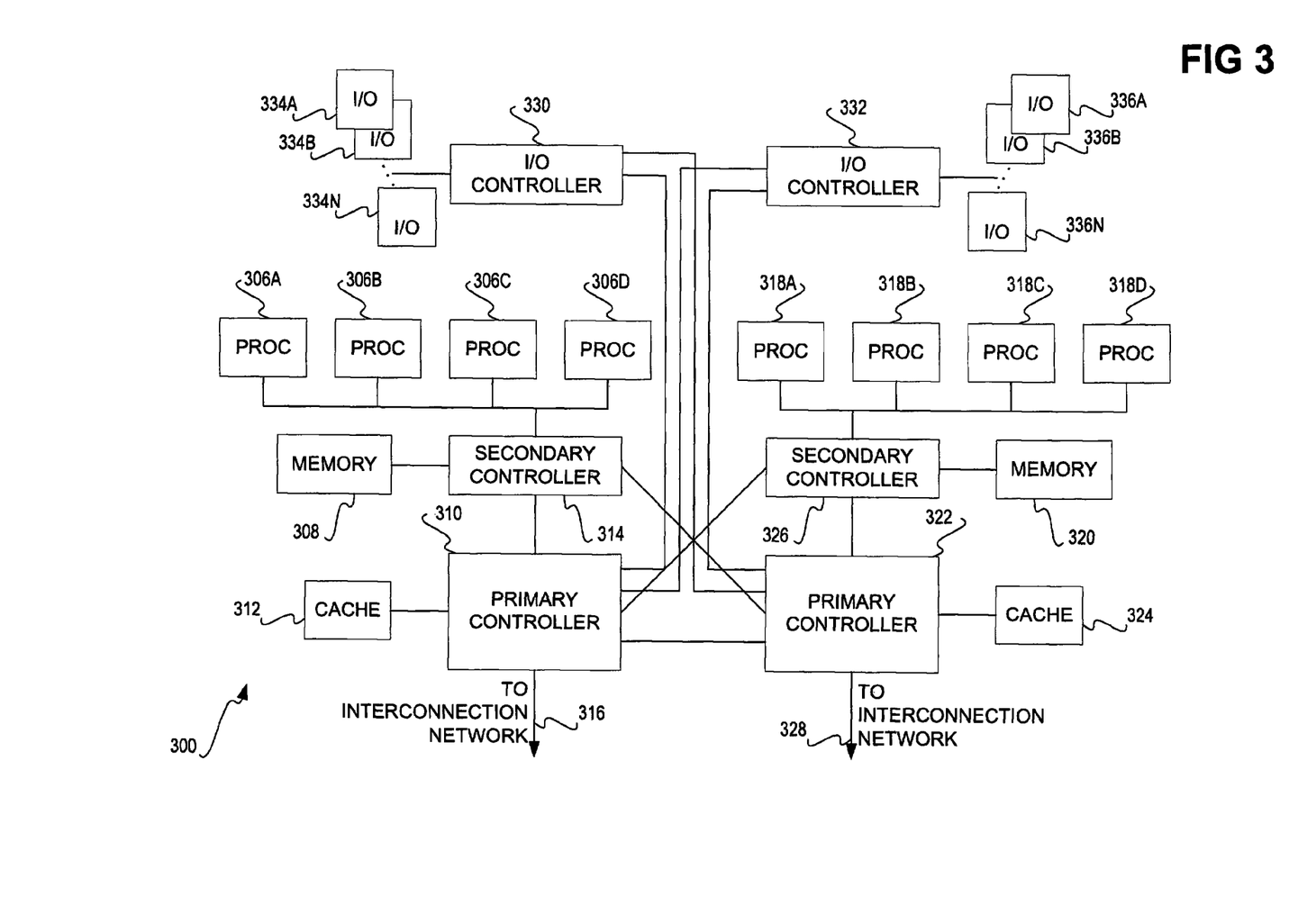
FIG. 3 is a diagram of one of the nodes of the multi-node system of FIG. 2 in more detail, according to an embodiment of the invention.

FIG. 3 shows in more detail a node 300, according to an embodiment of the invention, that can implement one or more of the nodes 202 of FIG. 2. As can be appreciated by those of ordinary skill within the art, only those components needed to implement one embodiment of the invention are shown in FIG. 3, and the node 300 may include other components as well. There are processors 306A, 306B, 306C, and 306D, collectively referred to as the processors 306, as well as processors 318A, 318B, 318C, and 318D, collectively referred to as the processors 318.

There are also a left local memory bank 308, and a right local memory bank 320. Left local memory bank 308 is a block of contiguous memory that is "home" or "near" to the processors 306. All memory in other nodes in the partition to which processors 306 and memory banks 308 belong is "remote" or "far". Right local memory bank 320 is a block of contiguous memory that is "home" or "near" to the processors 318. All memory in other nodes in the partition to which processors 318 and memory 320 belong is "remote" or "far". If all the processors and memory in the node are in the same partition, then the left local memory 308 is a "sibling" to processors 318 and the right local memory 320 is a "sibling" to processors 306. "Sibling" memory is farther than "near" memory but closer than "far" memory. "Remote" or "far" memory can be cached in caches 312 and 324. Even if the node is a single partition, memory 308 is not necessarily contiguous with memory 320.

The left and right primary controllers 310 and 322 manage requests to and responses from the memory banks 308 and 320. Each of the controllers 310 and 322 may be an applications-specific integrated circuit (ASIC) in one embodiment, as well as another combination of software and hardware. The controllers 310 and 322 also have caches 312 and 324, respectively, for managing requests and responses that relate to remote memory, which is the local memory of the nodes other than the node 300. Stated another way, the memory banks 308 and 320 are local to the node 300, and are remote to nodes other than the node 300.

The primary controller 310 preferably manages all requests and responses from either the memory bank 308 or the memory bank 320 that are even cache line addresses. The primary controller 322 preferably manages all requests and responses from either the memory bank 308 or the memory bank 320 that are odd cache line addresses. The cache 312 stores even remote cache lines that are being cached for the benefit of either memory bank. The cache 324 stores odd remote cache lines that are being cached for the benefit of either memory bank. The primary controller 310 manages the cache 312, and the primary controller 322 manages the cache 324. Note that if the left and right halves of the node are in different partitions, that primary controllers 310 and 322, and the caches 312 and 324, preferably segregate the requests and responses and the cache lines they manage such that there is no access to memory locations in a different partition.

Further, a left secondary controller 314 specifically interfaces the memory bank 308, the processors 306, and the primary controllers 310 and 322 with one another, and a right secondary controller 326 specifically interfaces the memory bank 320, the processors 318, and the primary controllers 310 and 322 with one another. The left primary controller 310 is able to communicate directly with the left secondary controller 314, as well as the right secondary controller 326. Similarly, the right primary controller 322 is able to communicate directly with the right secondary controller 326, as well as the left secondary controller 314. Each of the primary controllers 310 and 322 is preferably directly connected to one another and to the interconnection network that connects all the nodes, such as the interconnection network 204 of FIG. 2. This is indicated by the line 316, with respect to the primary controller 310, and by the line 328, with respect to the primary controller 322.

Similarly, a left input/output (I/O) controller 330 specifically interfaces left I/O components 334A, 334B, ... , 334N, which are collectively referred to as the left I/O components 334, and the right I/O controller 332 specifically interfaces right I/O components 336A, 336B, ... , 336N, which are collectively referred to as the right I/O components 336. The left primary controller 310 is able to communicate directly with the left I/O controller 330, as well as the right I/O controller 332. Similarly, the right primary controller 322 is able to communicate directly with the right I/O controller 332, as well as the left I/O controller 330.

Node Partitioning

Figure 4:
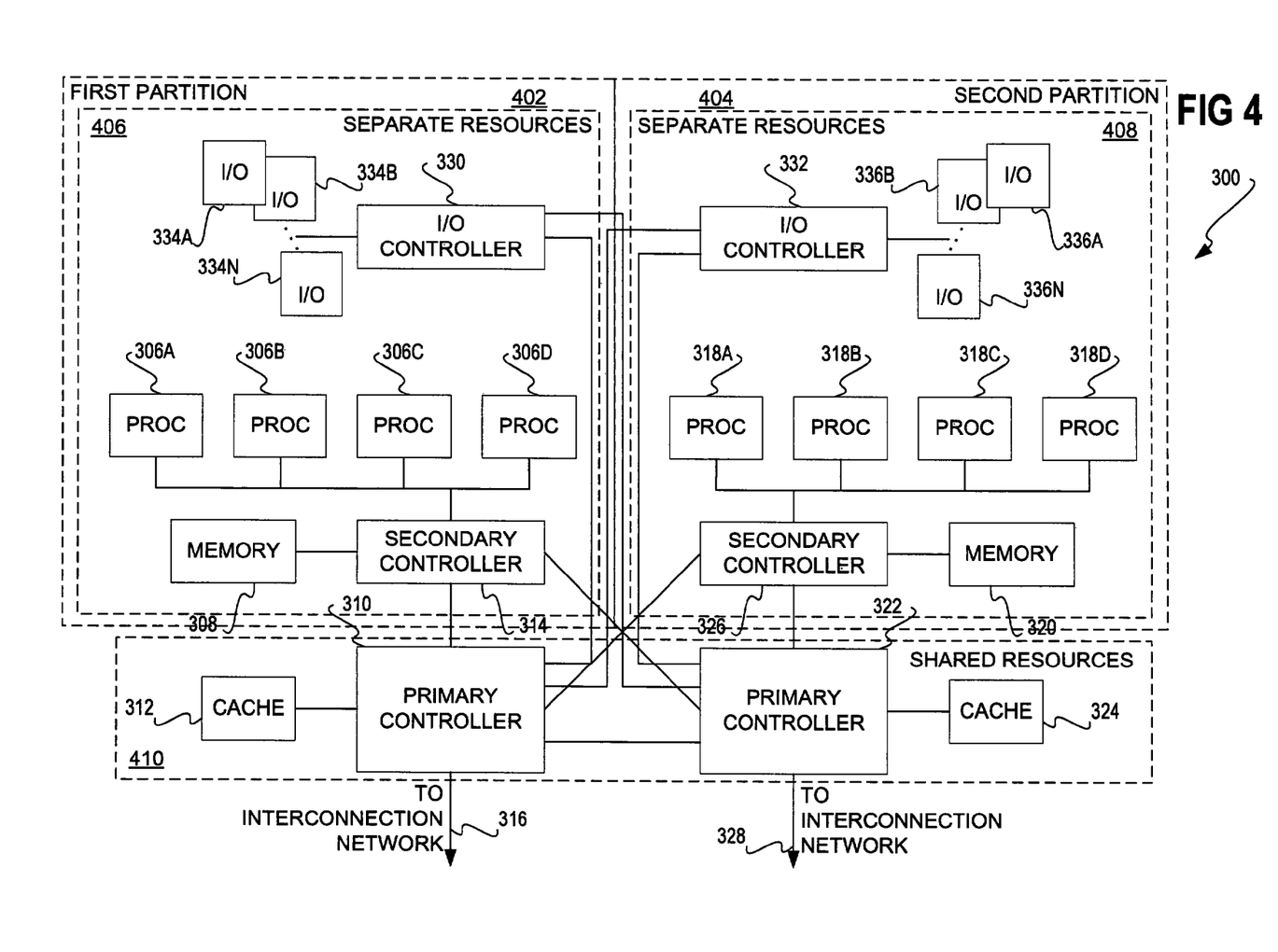
FIG. 4 is a diagram of the node of FIG. 3 having been partitioned into two partitions, according to an embodiment of the invention.

FIG. 4 shows the node 300 of FIG. 3 partitioned into a first partition 402 and a second partition 404, according to an embodiment of the invention. The partitions 402 and 404 are isolated from one another, and can be initialized and reset independently of one another. There are first, separate resources 406 and 408 for the partitions 402 and 404, respectively, as well as second, shared resources 410 shared by both the partitions 402 and 404.

The separate resources 406 for the first partition 402 include the processors 306, the local memory bank 308, the secondary controller 314, the input/output (I/O) controller 330, and the I/O components 334. Similarly, the separate resources 408 for the second partition 404 include the processors 318, the local memory bank 320, the secondary controller 326, the I/O controller 332, and the I/O components 336. The separate resources 406 for the first partition 402 are directly inaccessible by the separate resources 408 for the second partition 404, and likewise the separate resources 408 for the second partition 404 are directly inaccessible by the separate resources 406 for the first partition 402. This is because the separate resources 406 and 408 are physically partitioned to the partitions 402 and 404, respectively. That is, there is a physical boundary between the resources 406 and 408, namely a lack of direct connections between the resources 406 and 408.

The shared resources 410 include the primary controllers 310 and 322, as well as the caches 312 and 324 for the controllers 310 and 322, respectively. Each of the primary controllers 310 and 322 can be logically internally partitioned into both the partitions 402 and 404. That is, each of the primary controllers 310 and 322 is able to receive and process transactions from both the partitions 402 and 404 but keep the transactions segregated based on which partition the transaction relates to. This is accomplished by the primary controllers 310 and 322 internally separating transactions received from one of the partitions 402 and 404 from transactions received from the other of the partitions 402 and 404 when processing the transactions. For instance, the transactions received from partition 402 are not allowed to access or share information with the transactions received from partition 404, and conversely, transactions received from partition 404 are not allowed to access or share information with the transactions received from partition 402.

Figure 5:
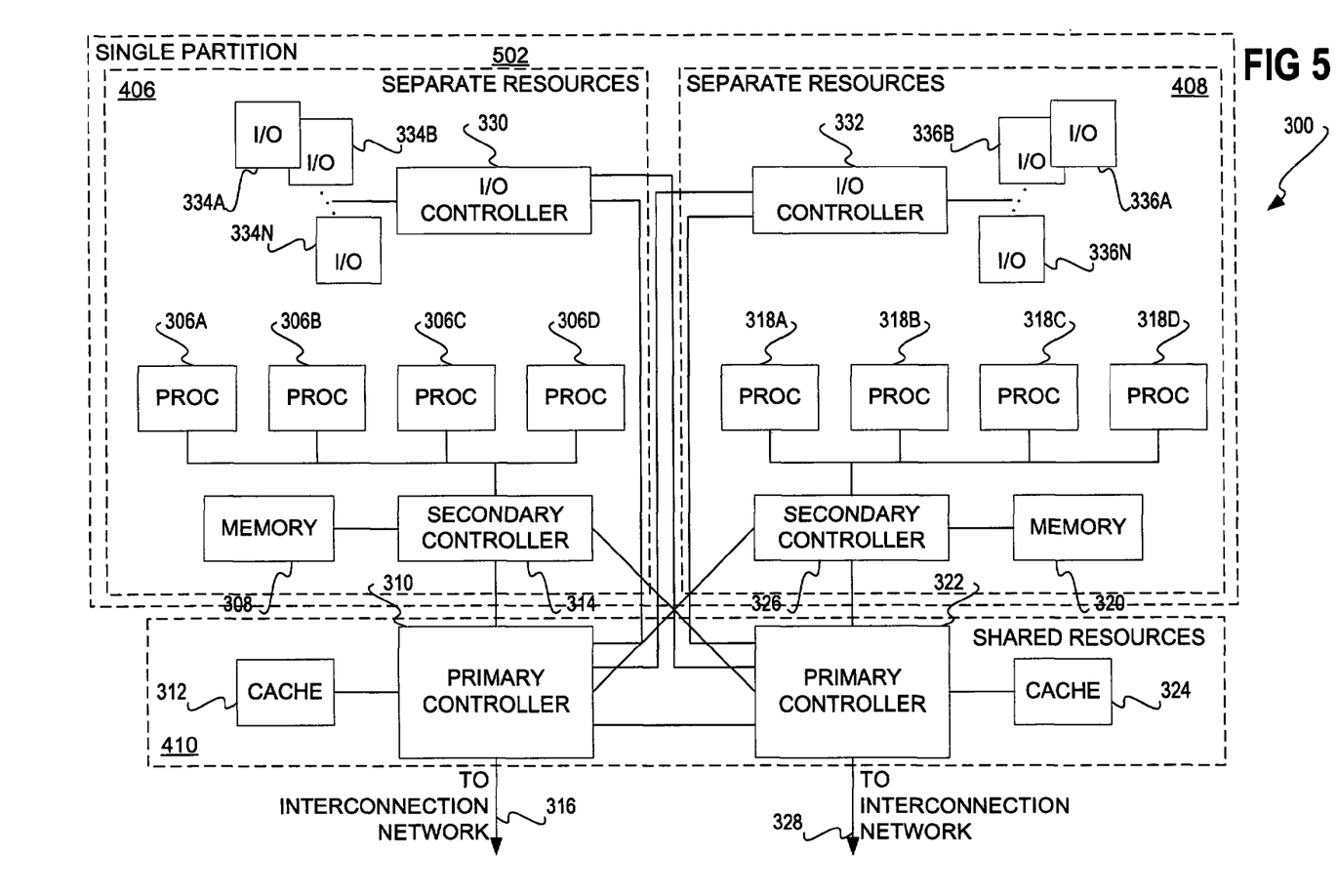
FIG. 5 is a diagram of the node of FIG. 3 having been partitioned into one partition, according to an embodiment of the invention.

FIG. 5 shows the node 300 of FIG. 3 alternatively partitioned into a single partition 502, according to an embodiment of the invention. The first, separate resources 406 and 408 remain separate, in that the resources 406 cannot directly access the resources 408, and vice-versa. However, in the embodiment of FIG. 5, they are nevertheless part of the single partition 502. For instance, even though the secondary controller 314 exclusively manages the memory bank 308, and the secondary controller 326 exclusively manages the memory bank 320, the controllers 314 and 326 and the memory banks 308 and 320 are considered part of the same partition 502. The same is true for the I/O controllers 330 and 332 and the I/O components 334 and 336 that they manage. The second, shared resources 410 are also part of the single partition 502. Furthermore, since the node is configured as a single partition, transactions received from resources 406 and 408 may freely access and share information between them.

For either the multiple-partition scenario of the embodiment of FIG. 4, or the single-partition scenario of the embodiment of FIG. 5, an incoming transaction to be performed by a partition preferably has a field set for it to distinguish with which partition the transaction is associated. The field determines which of the resources 406, 408, and/or 410 are to be used in processing the transaction, based on the partition to which the transaction pertains, as well as the operating system (OS) instance to which the transaction relates.

Any registers of the node 300, such as error and control/status registers, are also preferably associated with the correct partition. This can involve replicating register logic within the primary controllers 310 and 322 of the partitions, and steering the error or control/status operation to the appropriate controller and/or OS instance based on the partition field of the received transaction. Protection is desirably provided so that a partition cannot write to the registers of another partition. Such registers can include registers for controlling the a partition's memory range, registers for controlling a partition's logical identifier, registers that map logical identifiers to physical identifiers, and registers that provide routing tables within the fabric of the system as a whole.

Operating System Assumptions

Preferably, each partition in the system has its own operating system (OS) instance. This means that the instance of the OS running in one partition of the node or system operates separately from OS instances running in the other partition of the node or system. Each partition in the system has exactly one OS instance which is shared by all nodes in the system that are members of that partition. If a node is partitioned into two partitions, each can be a member of a different partition or can exist by itself as a stand-alone partition. The OS instances of such partitions may be instances of the same or different OS's. Examples of such OS's include, but are not limited to, UNIX, Linux, versions of the Microsoft Windows OS, and so on.

For dynamic partitioning to be able to be provided within the node 300, the following OS assumptions are provided in one embodiment of the invention. That is, for the partitioning of the node 300 to be redone without having to take either the node 300 or the system 200 of which it is part off-line or down, the following features of the OS are assumed in one embodiment. The assumptions are also provided so that the partitions are isolated from one another, and can be independently and individually initialized and reset. First, input/output (I/O components that are being partitioningly reconfigured are quiesced. Next, the location memory that is being partitioningly reconfigured is deallocated by the OS. Finally, the processors of a bus that are being partitioningly reconfigured are quiesced, such that the OS does not provide any activity to be performed by the processors. The local memory that is being partitioningly reconfigured is also deallocated by the OS.

Furthermore, any remote cache entries are purged across the entire OS, and any sharing of lines of local memory being reconfigured is terminated. All lines in the remote cache relative to the reconfigured local memory are brought to their home node. In one embodiment, such purging, termination, and bringing home may be accomplished by starting an appropriate process on the partition being reconfigured. In addition, for the newly added partition, the OS desirably enables the processors, I/O components, and memory for the partition. However, during the reconfiguration process, the OS desirably prevents access to cacheable addresses to the partition that is being added or removed. Finally, the OS preferably has the responsibility to add or delete entries for memory pages that are either added or deleted in the reconfiguration process.

Inter-Node Communication

Figure 6:
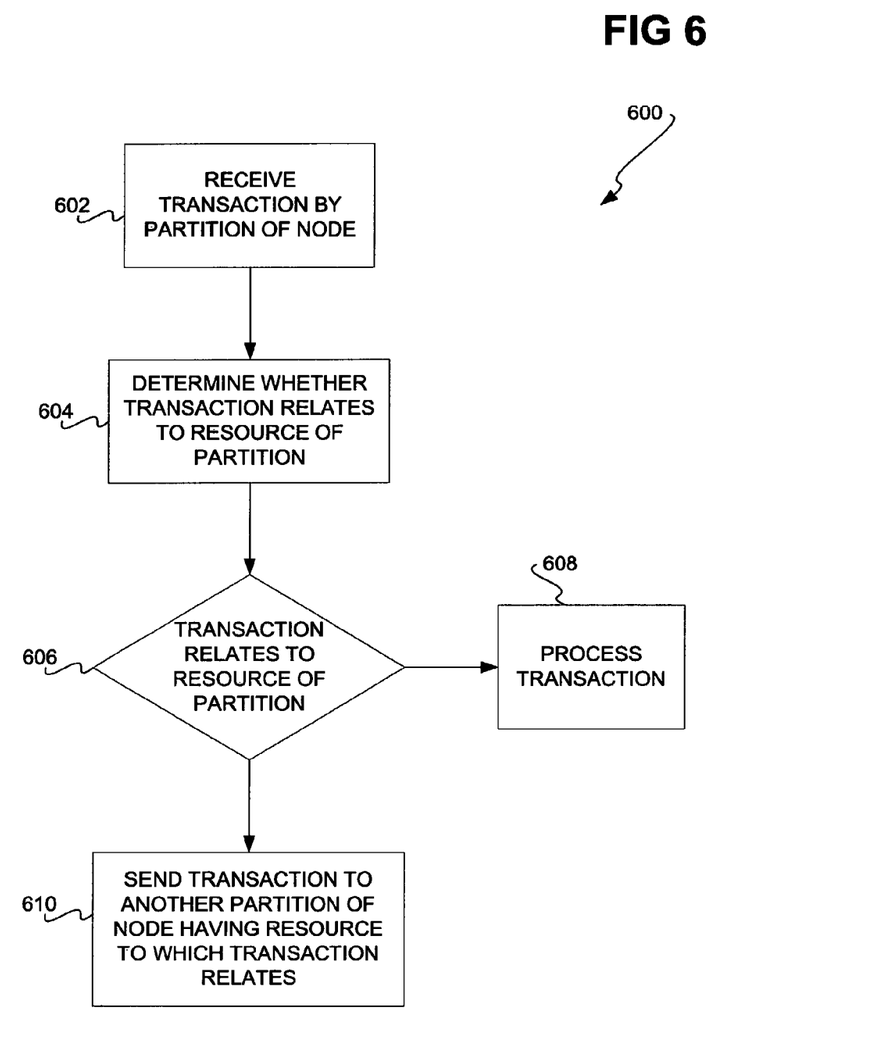
FIG. 6 is a flowchart of a method for transaction processing among partitions of a node of a multi-node system, according to an embodiment of the invention.

Thus far, embodiments of the invention have been described in relation to the partitioning of a node of a multi-node system into one or more partitions. Within a multi-node system, one node may communicate with another node. Where a node has more than one partition, therefore, communication with the node is more particularly with one of the partitions of the node. FIG. 6 shows a method 600 that details such communication from the perspective of a transaction received by a node having more than one partition, according to an embodiment of the invention.

A partition of a node first receives a transaction (602), from another partition of another node of the multi-node system. The transaction may be a request, a response, or another type of transaction. The transaction may relate to memory, input/output (I/O) devices, or may relate to another type of resource. The partition determines whether the transaction relates to a resource that has been partitioned to itself (604). If the transaction relates to one of the partition's own resources (606), then the partition processes the transaction itself (608). This can include, for instance, sending a response to the node that generated the transaction, where the transaction is a request. Alternatively, if the transaction does not relate to one of the partition's own resources (606), then this means that the transaction relates to the resources of another partition of the same node, and the partition sends the transaction to this other partition (608). The receiving partition then processes the transaction itself.

Advantages Over the Prior Art

Embodiments of the invention allow for advantages over the prior art. Because a single node can have more than one partition, node resources are not wasted, which could otherwise occur where a node may only have a single partition. The partitions within a single node are nevertheless isolated from one another, and can be independently individually reset and initialized. Registers for a given partition of the node are protected from access by the other partitions of the node. Errors that occur within a partition are also forwarded to the partition's particular operating system (OS) instance.

Alternative Embodiments

It will be appreciated that, although specific embodiments of the invention have been described herein for purposes of illustration, various modifications may be made without departing from the spirit and scope of the invention. For instance, the system that has been described in particular context to a node having one or two partitions. However, the invention is amenable to nodes having more than one or two partitions as well. As another example, the system that has been described has a primary controller that supports configuration into two partitions. However, in a different embodiment, the primary controller may also support more than two partitions. Similarly, the embodiment segments primary control into two controllers and caches; other embodiments may use a single controller and cache or more than two, or have no cache. Accordingly, the scope of protection of this invention is limited only by the following claims and their equivalents.

We claim:

1. A method for physically partitioning an entity of a multiple-entity system into more than one partition, each entity of the multiple-entity system including a plurality of processors, a plurality of memory, and one or more controllers interconnecting the processors to the memory, the entities interconnected to one another via an interconnection network, such that the memory of each entity is accessible within the entity via the controllers without having to traverse the interconnection network and is accessible to other of the entities by traversing the interconnection network, the method comprising:

physically partitioning a plurality of first resources among the more than one partition, in that the plurality of first resources physically partitioned to each partition are directly inaccessible by other partitions of the entity, and in that each first resource is accessible over the multiple-entity system through the partition to which the resource has been physically partitioned; and, internally logically partitioning a plurality of second resources among the more than one partition, in that each of the plurality of second resources internally separates transactions of one partition from transactions of other partitions, in that each second resource of all the second resources has a direct connection to at least one other second resource of the plurality of second resources, and in that the second resources are not physically partitioned among the more than one partition, where physical partitioning of a given resource to a first given partition requires that the given resource not be directly connected to any resource physically partitioned to a second given partition, and each second resource is accessible over the multiple-entity system through the partition to which the resource has been logically partitioned, wherein each second resource is a shared resource insofar as each second resource is not physically partitioned among the more than one partition, wherein each second resource of all the second resources is a resource of an entity of the multiple-entity system and is not a whole entity of the multiple-entity system, and wherein the plurality of second resources comprises a plurality of primary controllers, each primary controller logically partitioned to all of the more than one partition and to manage a cache, each primary controller to receive transactions from each of the more than one partition, each primary controller directly connected to each of the more than one partition.

2. The method of claim 1, wherein physically partitioning the plurality of first resources among the more than one partition comprises physically partitioning the plurality of first resources between a first partition and a second partition, and wherein logically partitioning the plurality of second resources among the more than one partition comprises logically partitioning the plurality of second resources between the first partition and the second partition.

3. The method of claim 1, wherein physically partitioning the plurality of first resources comprises assigning a controller to manage the partitions.

4. The method of claim 1, wherein physically partitioning the plurality of first resources comprises physically partitioning an input/output (I/O) controller to each partition, each I/O controller exclusively managing a subset of I/O components of the entity, such that the subset of I/O components are correspondingly physically partitioned to the partition of the I/O controller.

5. The method of claim 1, further comprising dynamically repartitioning the more than one partition of the entity into a single partition.

6. The method of claim 5, wherein dynamically repartitioning the more than one partition of the entity into the single partition comprises:
   physically repartitioning the plurality of first resources to the single partition; and,
   internally logically repartitioning the plurality of second resources to the single partition.

7. The method of claim 5, further comprising dynamically partitioning the single partition of the entity into more than one partition.

8. A multiple-entity system comprising:
   a plurality of entities, each entity including a plurality of processors, a plurality of memory, and one or more controllers interconnecting the processors to the memory; and,
   an interconnection network interconnecting the entities, such that the memory of each entity is accessible within the entity via the controllers without having to traverse the interconnection network and is accessible to other of the entities by traversing the interconnection network,
   each entity partitionable into one or more partitions and comprising:
      a plurality of first resources dynamically physically partitionable into the one or more partitions in that the plurality of first resources physically partitioned to each partition are directly inaccessible by other partitions of the entity, and in that each first resource is accessible over the multiple-entity system through the partition to which the resource has been physically partitioned; and,
      a plurality of second resources dynamically internally logically partitionable among the one or more partitions, in that each second resource internally separates transactions of one partition from transactions of other partitions, in that each second resource of all the second resources has a direct connection to at least one other second resource of the plurality of second resources, and in that the second resources are not physically partitioned among the more than one partition, where physical partitioning of a given resource to a first given partition requires that the given resource not be directly connected to any resource physically partitioned to a second given partition,
   wherein each second resource is a shared resource insofar as each second resource is not physically partitioned among the more than one partition,
   wherein each second resource of all the second resources is a resource of an entity of the multiple-entity system and is not a whole entity of the multiple-entity system,
   and wherein the plurality of second resources comprises a plurality of primary controllers, each primary controller logically partitioned to all of the more than one partition and to manage a cache, each primary controller to receive transactions from each of the more than one partition, each primary controller directly connected to each of the more than one partition.

9. The system of claim 8, wherein the plurality of first resources of each entity comprises local memory of the entity, local processors of the entity, and input/output (I/O) components of the entity.

10. The system of claim 8, wherein the plurality of first resources of each entity comprises one or more input/output (I/O) controllers corresponding to the one or more partitions into which the entity is partitionable, each I/O controller exclusively managing a subset of I/O components of the entity, such that the subset of I/O components are correspondingly physically partitioned to the partition of the I/O controller.

11. The system of claim 8, wherein the plurality of second resources of each entity comprises remote cache memory of the entity.

12. The system of claim 8, wherein each of the one or more partitions of each entity has associated therewith one or more registers, such that the one or more registers of each partition are protected from access by other of the one or more partitions.

13. The system of claim 8, wherein each of the one or more partitions of each entity has an operating system (OS) instance associated therewith that is consistent with assumptions providing for dynamic partitioning of the entity.

14. The system of claim 13, wherein the assumptions comprise one or more of:
   quiescing of processors that are being partitioningly reconfigured;
   quiescing of input/output (I/O) components that are being partitioningly reconfigured;
   deallocation of local memory that is being partitioningly reconfigured;
   purging of remote cache entries;
   terminating of local memory sharing;
   bringing home of remote cache lines to a home entity;
   prevention of access to cacheable address of the new partition; and,
   adding and delete of memory page entries added and deleted during partition reconfiguration.

* * * * *